(12) United States Patent
West

(10) Patent No.: US 6,618,823 B1
(45) Date of Patent: Sep. 9, 2003

(54) METHOD AND SYSTEM FOR AUTOMATICALLY GATHERING INFORMATION FROM DIFFERENT TYPES OF DEVICES CONNECTED IN A NETWORK WHEN A DEVICE FAILS

(75) Inventor: Christopher West, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/639,652

(22) Filed: Aug. 15, 2000

(51) Int. Cl.[7] ................................................ H02H 3/05
(52) U.S. Cl. ............................... 714/25; 714/4; 714/43
(58) Field of Search ............................... 714/4, 25, 43, 714/56, 57, 48

(56) References Cited

U.S. PATENT DOCUMENTS

| | | |
|---|---|---|
| 3,704,363 A | 11/1972 | Salmassy et al. |
| 5,119,377 A | 6/1992 | Cobb et al. |
| 5,463,768 A | 10/1995 | Cuddihy et al. |
| 5,485,573 A | 1/1996 | Tandon |
| 5,504,861 A | 4/1996 | Crockett et al. |
| 5,619,644 A | 4/1997 | Crockett et al. |
| 5,790,777 A | 8/1998 | Izuta et al. |
| 5,845,062 A * | 12/1998 | Branton et al. ................ 714/25 |
| 5,862,316 A | 1/1999 | Hagersten et al. |
| 6,000,041 A * | 12/1999 | Baker et al. ................... 714/39 |
| 6,052,758 A | 4/2000 | Crockett et al. |
| 6,374,293 B1 * | 4/2002 | Dev et al. .................... 709/220 |
| 6,446,134 B1 * | 9/2002 | Nakamura .................... 709/313 |

FOREIGN PATENT DOCUMENTS

EP 0 737 920 A 10/1996

OTHER PUBLICATIONS

Hideki Sakauchi et al: "A Self–Healing Network with an Economical Spare–Channel Assignment". Communications: Connecting the Future. San Diego, Dec. 2–5, 1990, Proceedings of the Global Telecommunications Conference and Exhibition (Globecom), New York, IEEE, US, vol. 1, Dec. 2, 1990 pp. 438–443.

* cited by examiner

Primary Examiner—Scott Baderman
Assistant Examiner—Joshua Lohn
(74) Attorney, Agent, or Firm—Brooks & Kushman P.C.

(57) ABSTRACT

A method and system for automatically gathering information from different types of devices connected in a network when a device fails includes a network connecting a plurality of different types of devices which communicate with one another across the network. A network controller determines which devices in the network are capable of saving failure information during the time when one of the devices encounters an error. The network controller determines when one of the devices encounters an error. The network controller then gathers the failure information from the devices upon determining that one of the devices has encountered an error.

10 Claims, 1 Drawing Sheet

METHOD AND SYSTEM FOR AUTOMATICALLY GATHERING INFORMATION FROM DIFFERENT TYPES OF DEVICES CONNECTED IN A NETWORK WHEN A DEVICE FAILS

TECHNICAL FIELD

The present invention generally relates to a method and system for automatically gathering information from different types of devices connected in a network when a device fails such that the information can be used to determine the solution for the failing device.

BACKGROUND ART

A network may connect many different types of devices. Some of the devices may be located remotely from a central point such as a control site of the network. When a problem occurs within one of the devices, the problem often times is found to be inconclusive due to lack of information. Often, in order to determine the cause of the problem and the solution for the problem, it is necessary to analyze information from the other devices during the time when the problem occurred within the one device.

SUMMARY OF THE INVENTION

Accordingly, it is an object of the present invention to provide a method and system for automatically gathering information from different types of devices connected in a network when a device fails such that the information can be used to determine the solution for the failing device.

It is another object of the present invention to provide a method and system for automatically gathering debug and failure information from different types of devices connected in a network when a device encounters an error in which a network controller becomes aware of the error and then gathers the debug and failure information from the other devices at the time of the error.

It is a further object of the present invention to provide a method and system for automatically gathering debug and failure information from different types of devices connected in a network when a device encounters an error in which a network controller determines which devices in the network are capable of saving debug and failure information and then gathers the debug and failure information from such devices when a device error occurs.

In carrying out the above objects and other objects, the present invention provides a system having a network connecting a plurality of different types of devices which communicate with one another across the network. The system further includes a network controller for determining which devices in the network are capable of saving failure information during the time when one of the devices encounters an error, for determining when one of the devices encounters an error, and for automatically gathering the failure information from the devices upon determining that one of the devices has encountered an error.

In different embodiments of the present invention, the network controller is operable for transmitting a save command to the devices for saving failure information upon determining that one of the devices has encountered an error. The network controller is operable for polling the devices to determine when one of the devices has encountered an error. The network controller automatically gathers failure information from the devices by reading the failure information from the devices.

In another embodiment of the present invention the devices are operable for transmitting failure information to the network controller. The network controller is operable for transmitting a transmit command to the devices for instructing the devices to transmit the failure information to the network controller for automatically gathering the failure information upon the network controller determining that one of the devices has encountered an error.

In carrying out the above objects and other objects, the present invention further provides a method for a network having a plurality of different types of devices which communicate with one another across the network. The method includes determining which devices in the network are capable of saving failure information during the time when one of the devices encounters an error. The method then determines when one of the devices in the network encounters an error. The failure information from the devices is then automatically gathered at a network controller upon the determination that one of the devices has encountered an error.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
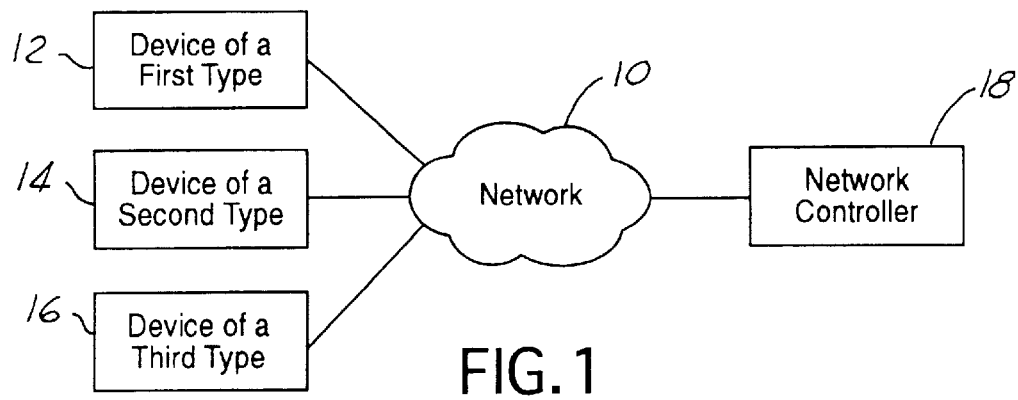
FIG. 1 illustrates a network having a plurality of different types of devices in accordance with the method and system of the present invention.

Referring now to FIG. 1, a network 10 in accordance with the method and system of the present invention is shown. Network 10 connects a plurality of different devices together for the devices to communicate with one another. As shown in FIG. 1, network 10 connects a device of a first type 12, a device of a second type 14, and a device of a third type 16 together so that each of the devices can communicate with one another to perform their respective functions. Devices 12, 14, and 16 may be generally located remote from one another. Devices 12, 14, and 16 include a wide assortment of device types such as personal computers, printers, storage devices, storage configurations, handheld computer devices, wireless devices, and the like. Network 10 includes local and wide area networks, a fibre fabric network, an Internet protocol network, a storage area network, and the like. Some of devices 12, 14, and 16 are operable for saving information such as processing traces during operation. Such information can provide insight as to why another device on the network has encountered an error and how to solve the problem causing the error. This information is referred to as debug and failure information.

Network 10 also connects a network controller 18 to devices 12, 14, and 16. Network controller 18 generally monitors the conditions of each of devices 12, 14, and 16 to determine when one of the devices encounters an error or fails during operation. When one of devices 12, 14, and 16 encounters an error indicative of a problem occurring within the one device, it is often necessary to analyze debug and failure information at the time of the error from the other devices to determine the cause and solution of the problem with the device encountering the error. To this end, network controller 18 is operable to generate a list of devices 12, 14, and 16 that are capable of storing debug and failure information. Network controller 18 is further operable to communicate with devices 12, 14, and 16 to know when a device has encountered an error.

Upon determining that one of devices 12, 14, and 16 has encountered an error, network controller 18 commands the devices on the list to each store the debug and failure information at the time of the error. Network controller 18 then automatically gathers the debug and failure information from each of devices 12, 14, and 16 on the list. Network controller 18 gathers the debug and failure information by reading such information from each of listed devices 12, 14, and 16. Devices 12, 14, and 16 may transmit the debug and failure information to network controller 18. The debug and failure information from the listed devices 12, 14, and 16 may then be analyzed to determine the cause and solution of the error encountered by the failing device. Of course, network controller 18 could also be a device such as devices 12, 14, and 16 in which the network controller performs device and controller functions.

Figure 2:
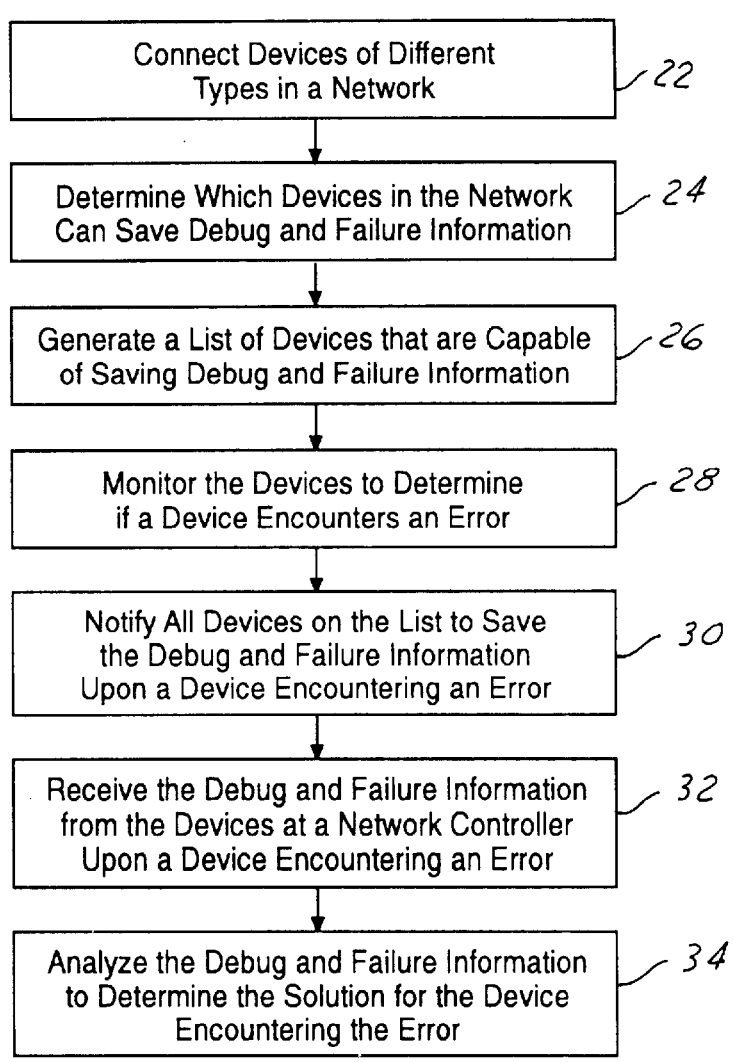
FIG. 2 illustrates a flowchart describing operation of the method and system of the present invention.

Referring now to FIG. 2, with continual reference to FIG. 1, a flow chart 20 illustrating operation of the method and system of the present invention is shown. Flow chart 20 begins with connecting different types of devices 12, 14, and 16 within a network 10 as shown in block 22. A network controller 18 then determines which devices 12, 14, and 16 are capable of saving debug and failure information as shown in block 24. Network controller 18 then generates a list of devices 12, 14, and 16 that are capable of saving the debug and failure information as shown in block 26.

Network controller 18 then monitors devices 12, 14, and 16 to determine if one of the devices encounters an error during operation as shown in block 28. Upon a device encountering an error, network controller 18 notifies all devices 12, 14, and 16 on the list to save the debug and failure information during the time that the one device encountered an error as shown in block 30. Network controller 18 then receives the saved debug and failure information from listed devices 12, 14, and 16 as shown in block 32. Network controller 18 may read the saved information from listed devices 12, 14, and 16 or the listed devices may transmit the information to the network controller. The gathered debug and failure information is then analyzed to determine the cause and solution for the device encountering the error as shown in block 34.

Thus it is apparent that there has been provided, in accordance with the present invention, a method and system for automatically gathering information from different types of devices connected in a network when a device fails that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for automatically gathering information from different types of devices connected in a network when a device in the network fails, the system comprising:

a network connecting a plurality of different types of devices which communicate with one another across the network, wherein at least one of the devices in the network is capable of saving debug and failure information indicative of operation of the respective at least one device during the time when a device in the network encounters an error; and a network controller for determining the identity of the at least one of the devices in the network which are capable of saving the debug and failure information during the time when one of the devices in the network encounters an error, for determining when and which one of the devices encounters an error, and for gathering the saved debug and failure information from the at least one of the devices upon determining that one of the devices has encountered an error, the saved debug and failure information gathered from the at least one of the devices being used to determine a cause and a solution of the encountered error;

wherein, upon determining that one of the devices has encountered an error, the network controller is operable for transmitting a save command to the at least one of the devices in the network for commanding the at least one of the devices to save the debug and failure information where the devices save debug and failure information at the system level regardless of the software running on the devices.

2. The system of claim 1 wherein:

the network controller is operable for polling the devices to determine when one of the devices has encountered an error.

3. The system of claim 1 wherein:

the network controller automatically gathers debug and failure information from the devices by reading the debug and failure information from the devices.

4. The system of claim 1 wherein:

the devices are operable for transmitting the saved debug and failure information to the network controller, wherein the network controller is operable for transmitting a transmit command to the devices for instructing the devices to transmit the saved debug and failure information to the network controller for gathering the saved debug and failure information upon the network controller determining that one of the devices has encountered an error.

5. The system of claim 1 wherein:

the network controller is one of the plurality of devices.

6. A method for a network having a plurality of different types of devices which communicate with one another across the network, the method comprising:

configuring at least one of the devices in the network to be capable of saving debug and failure information indicative of operation of the respective at least one device during the time when a device in the network encounters an error;

determining the identity of the at least one of the devices in the network which are capable of saving the debug and failure information during the time when one of the devices in the network encounters an error;

determining when and which one of the devices in the network encounters an error;

upon the determination that one of the devices has encountered an error, transmitting a save command to the at least one of the devices in the network for commanding the at least one of the devices to save the debug and failure information where the devices save debug and failure information at the system level regardless of the software running on the devices;

gathering the saved debug and failure information from the at least one of the devices at a network controller upon the determination that one of the devices has encountered an error; and using the saved debug and failure information gathered from the at least one of the devices to determine a cause and a solution of the encountered error.

7. The method of claim 6 wherein:

determining when one of the devices encounters an error includes polling the devices to determine when one of the devices has encountered an error.

8. The method of claim 6 wherein:

gathering the saved debug and failure information from the devices includes reading the saved debug and failure information from the devices with the network controller.

9. The method of claim 6 wherein:

gathering the saved debug and failure information from the devices includes transmitting a transmit command to the devices for instructing the devices to transmit the saved debug and failure information to the network controller upon the determination that one of the devices has encountered an error.

10. A method for a network having a plurality of different types of devices which communicate data with one another across the network, the method comprising:

configuring at least one of the devices in the network to be capable of saving debug and failure information indicative of operation of the respective at least one device during the time when a device in the network encounters an error;

generating a list of the devices in the network which are capable of saving the debug and failure information during the time when one of the devices in the network encounters an error;

polling the devices from a network controller to determine if a device has encountered an error;

transmitting a save command from the network controller to the devices on the list instructing the listed devices to save debut and failure information upon the network controller determining that one of the devices has encountered an error where the devices save debug and failure information at the system level regardless of the software running on the devices;

gathering at the network controller the saved debug and failure information from the listed devices upon the network controller transmitting the save command to the devices on the list; and using the saved debug and failure information gathered from the listed devices to determine a cause and a solution of the encountered error.

* * * * *